United States Patent [19]

Powell

[11] Patent Number: 5,007,301

[45] Date of Patent: Apr. 16, 1991

[54] COMBINED STEERING AND CONTROL HEAD FOR A FLOOR CONVEYOR VEHICLE

[75] Inventor: Robert Powell, Pforzheim, Fed. Rep. of Germany

[73] Assignee: Dr. Ing. h.c.F. Porsche AG, Fed. Rep. of Germany

[21] Appl. No.: 443,327

[22] Filed: Nov. 30, 1989

[30] Foreign Application Priority Data

Dec. 1, 1988 [DE] Fed. Rep. of Germany ....... 3840800

[51] Int. Cl.$^5$ .......................... B62D 1/06; G05G 1/10
[52] U.S. Cl. ......................................... 74/557; 74/543
[58] Field of Search .......................... 74/551.1–551.9, 74/543, 557–558.5

[56] References Cited

U.S. PATENT DOCUMENTS

| 2,737,060 | 3/1956 | Russell | 74/557 |
| 3,088,350 | 5/1963 | Stilwell | 74/557 |
| 3,196,709 | 7/1965 | Bickford | 74/557 |
| 3,256,749 | 6/1966 | Grohsbach | 74/557 X |
| 3,828,593 | 8/1974 | Bolton | 74/557 X |

FOREIGN PATENT DOCUMENTS

| 2319618 | 11/1974 | Fed. Rep. of Germany . | |
| 2061209 | 5/1981 | United Kingdom | 74/557 |

OTHER PUBLICATIONS

Single page excerpt with illustration and article "Deichselkopf erneut Verbessert." German Publication—Hebe u. Fördertechnic.

Primary Examiner—Vinh T. Luong
Attorney, Agent, or Firm—Evenson, Wands, Edwards, Lenahan & McKeown

[57] ABSTRACT

A combined steering and control head connected by a shaft to guide a floor conveyor vehicle having a fork lifting driving mechanism. This steering head has handles at the end of the shaft which are arranged on both sides of a shaft horn and are held rotatably with the same axis as driving control devices disposed next to the horn. A lifting and lowering switch for controlling lifting movement of a loading fork is arranged adjacent to an end face of the horn. The driving control device consists of a disk-shaped segment at the circumference of which is a first actuating surface extending transversely with respect to the handle. A second actuating surface is arranged at the circumference of the segment opposite the first surface such that at least one of the actuating surfaces can be gripped together with an operating surface of the lifting and lowering switch.

8 Claims, 2 Drawing Sheets

COMBINED STEERING AND CONTROL HEAD FOR A FLOOR CONVEYOR VEHICLE

BACKGROUND AND SUMMARY OF THE INVENTION

The invention relates to a combined steering and control head for a floor conveying vehicle which has a lifting fork and a drive mechanism and wherein the steering and control head is connected to the vehicle by a shaft. The steering and control head has handles at the end of the shaft which are arranged on both sides of a shaft horn. Driving control devices are disposed next to the horn and adjacent the handles. A lifting and lowering switch for lifting movement of a loading fork is arranged adjacently an end face of the horn.

DESCRIPTION OF THE PRIOR ART

A floor conveyor vehicle with a driving mechanism is known from DE-PS 23 19 618. This vehicle is guided manually by way of a shaft which has a steering head with handles and operating elements arranged next to these handles. Additional switches for lifting and lowering of a loading fork are arranged adjacent a horn of the steering head. In the case of this known vehicle, the operating elements are provided such that control of a lifting movement of the loading fork, which coincides with a control of the driving operation cannot be carried out in a simple manner.

SUMMARY OF THE INVENTION

It is an object of the invention to provide an improved operation of a floor conveyor vehicle by means of which combined operating possibilities are ensured.

According to the invention, this object is achieved by having the driving control device comprising an approximately disk-shaped segment with a first actuating surface that, at the circumference, extends transversely with respect to a handle of the steering and control head and with a second actuating surface arranged at the circumference of the segment (opposite the first surface) such that at least one of the actuating surfaces can be gripped together with an operating surface of the lifting and lowering switch for the loading fork.

Preferably the first actuating surface comprises a trough for an operator's thumb, and the second actuating surface has a cam which extends out of a plane (X—X) of the segment in an axially projecting manner and which has a shape around which an operator's finger can grip. The operating surfaces of the lifting and lowering switch are arranged in the gripping range of an operator's thumb such that a simultaneous actuating of the adjacent cam of the driving control device by an operator's finger is possible. The operating surfaces of the lifting and lowering switch are separated by a short bridgeable gripping distance to the trough of the driving control device.

The principal advantage achieved by means of the invention is that the operator can adjustably reach with his thumb and index finger around the driving control device and by a slight shifting of the thumb from the driving control device to the lifting and lowering switch, the operator can control a driving operation and at the same time, the loading fork can also be lifted or lowered by means of a control switch.

For this purpose, the driving control device has a special design with two actuating surfaces for the operator's hand. The surfaces are located opposite one another in such a manner that the user's hand, without being subjected to fatigue and when reaching around the handle, can simultaneously operate the driving control device by way of these two actuating surfaces or at least one of the actuating surfaces A lifting and lowering switch disposed directly in the griping area of the thumb of the operating hand can be actuated simultaneously without any significant changed grip of the hand on the handle.

Other objects, advantages and novel features of the present invention will become apparent from the following detailed description of the invention when considered in conjunction with the accompanying drawings.

DETAILED DESCRIPTION OF THE DRAWINGS

Figure 1:
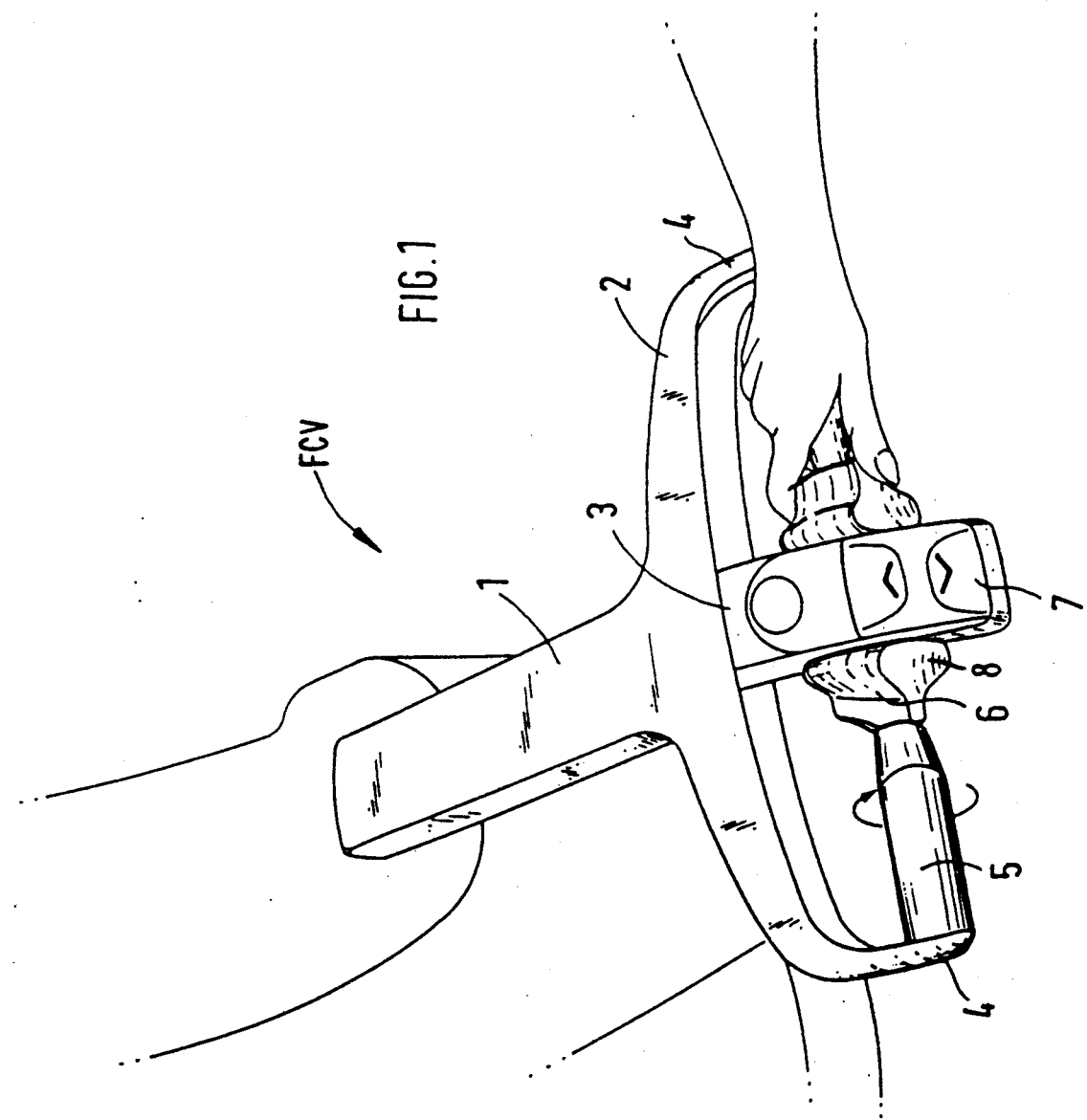
FIG. 1 is a schematic view of the steering head of a floor conveyor vehicle having operating elements, such as a driving control device and a lifting and lowering switch.

A pivotally connected shaft 1 of a steering head 2 is provided for guiding and operating a floor conveyor vehicle FCV (only one end of which is shown in FIG. 1). Handles 5 are located between a horn 3 on a side of the shaft 1 opposite the pivotal connection to the vehicle and legs 4 of the steering head 2. Driving control devices 6 are provided on both sides of the horn 3 and have the same axis as the handles 5. The control devices 6 include a lifting and lowering switch 7 for the loading forks of the conveyor vehicle as well as an emergency switch being arranged in the horn 3.

Figure 2:
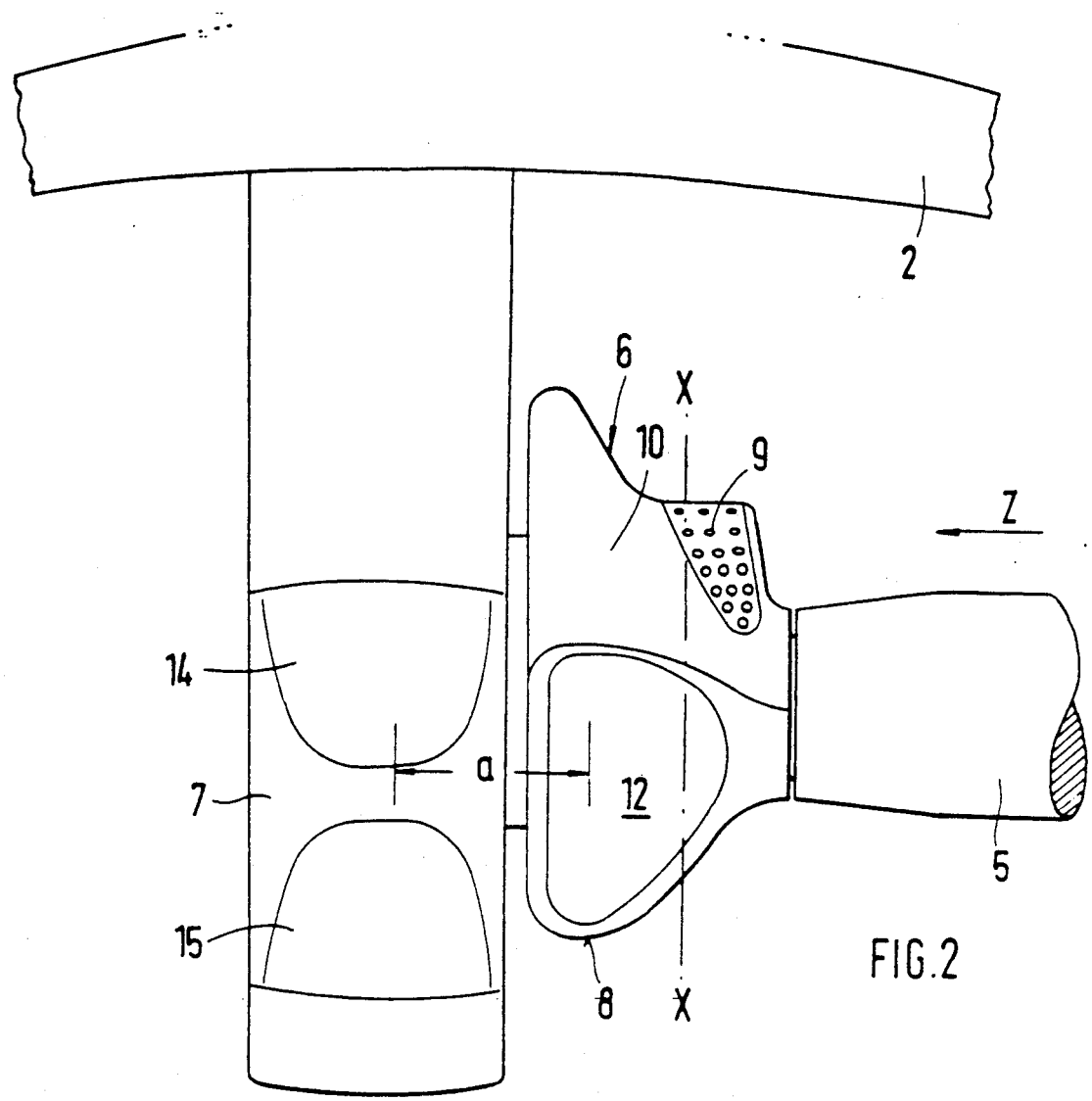
FIG. 2 is a top view of a part of the steering head having a handle and the operating elements.
Figure 3:
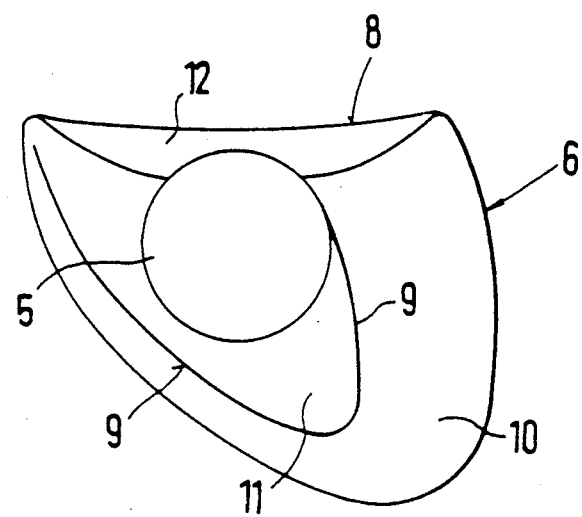
FIG. 3 is a view in the direction of arrow Z of FIG. 2 of the driving control device with its two actuating surfaces.

The driving control device 6 (see FIGS. 2 and 3) is relatively rotatable with respect to the handles 5 and consists of an approximately disk-shaped segment 10 having two actuating surfaces 8 and 9 arranged on the side of the circumference. The first actuating surface 8 extends approximately transversely with respect to the handle 5 and is constructed in the shape of a trough. In its inoperative position, the surface 8 is disposed in a plane parallel to the operating surfaces 14, 15 of the lifting and lowering switch 7 on the horn 3.

The second actuating surface 9 of the driving control device 6 is arranged almost opposite the first actuating surface 8 and is formed by a cam 11. This cam 11 connects to and extends axially away from the plane X—X of the disk-shaped segment 10 toward the handle 5.

The actuating surfaces 8 and 9 are arranged and constructed such that, when an operator's hand reaches around the handle 5, the thumb is disposed on the first actuating surface 8, and the index finger reaches around the cam 11 as shown in FIG. 1.

The first actuating surface 8 of the driving control device 6 is arranged directly adjacent to the switch 7 and its operating surfaces 14, 15 and is separated therefrom by a short bridgeable gripping distance "a". This permits an operator to shift the thumb of the operating hand from the trough 12 of the actuating surface 8 of the driving control device 6 to the operating surfaces 14, 15 of the lifting and lowering switch 7 in order to control the loading fork in a simple manner. At the same time however, the operator can reach around the cam 11 so that the driving control device 6 may also be turned by an index finger. This allows for a combined driving and lifting movement for the vehicle to become possible.

Although the present invention has been described and illustrated in detail, it is to be clearly understood that the same is by waY of illustration and example only, and is not to be taken by way of limitation. The spirit and scope of the present invention are to be limited only by the terms of the appended claims.

What is claimed:

1. A combined steering and control head for use with a floor conveyor vehicle of the type having a fork lifting mechanism and a driving mechanism and being manually guided by way of a shaft coupled to the combined steering and control head, said combined steering and control head comprising:
   a steering head at the end of the shaft;
   a shaft horn on the combined steering and control head and located adjacent the end of the shaft;
   handles on the combined steering and control head arranged one on each side of the shaft horn;
   driving control means disposed next to the horn for controlling the drive mechanism; and
   a lifting and lowering switch means arranged adjacent an end face of the horn for controlling a lifting mechanism of a lifting fork;
   wherein the driving control means includes an approximately disk-shaped segment having at a circumference thereof a first actuating surface which extends transversely with respect to the handles, and
   a second actuating surface arranged at the circumference of the disk shaped segment and opposite to the first actuating surface such that at least one of the actuating surfaces can be gripped together with an operating surface of the lifting and lowering switch means.

2. A combined steering and control head according to claim 1, wherein the first actuating surface comprises a trough for an operator's thumb;
   wherein the second actuating surface has a cam which extends out of a plane of the segment in an axially projecting manner; and
   wherein the second actuating surface has a shape around which an operator's finger can grip.

3. A combined steering and control head according to claim 1, wherein the lifting and lowering switch has two operating surfaces which are arranged in the gripping range of an operator's thumb to allow a simultaneous actuating of the lifting and lowering switch means by a thumb of the operator and actuation of a cam of the driving control means by an operator's finger.

4. A combined steering and control head according to claim 2, wherein the lifting and lowering switch has two operating surfaces which are arranged in the gripping range of an operator's thumb to allow a simultaneous actuating of the lifting and lowering switch means by a thumb of the operator and actuation of the cam of the driving control means by an operator's finger.

5. A combined steering and control head according to claim 1, wherein operating surfaces of the lifting and lowering switch means are separated by a short bridgeable gripping distance to a trough of the first actuating surface of the driving control means.

6. A combined steering and control head according to claim 2, wherein operating surfaces of the lifting and lowering switch means are separated by a short bridgeable gripping distance to the trough of the first actuating surface of the driving control means.

7. A combined steering and control head according to claim 3, wherein operating surfaces of the lifting and lowering switch means are separated by a short bridgeable gripping distance to a trough of the first actuating surface of the driving control means.

8. A combined steering and control head according to claim 4, wherein operating surfaces of the lifting and lowering switch means are separated by a short bridgeable gripping distance to a trough of the first actuating surface of the driving control means.

* * * * *